BINARY-TO-DIGITAL TRANSLATION APPARATUS

Filed April 13, 1960 2 Sheets-Sheet 1

| DECIMAL | BINARY |
|---|---|
| 0 | 000 |
| 6 | 110 |
| 4 | 100 |
| 2 | 010 |
| 5 | 101 |
| 3 | 011 |
| 1 | 001 |
| 7 | 111 |

INVENTORS
GEORGE F. MARETTE
PETER WARBURTON

BY Cushman, Darby & Cushman
ATTORNEYS

BINARY-TO-DIGITAL TRANSLATION APPARATUS

Filed April 13, 1960 2 Sheets-Sheet 2

INVENTORS

GEORGE F. MARETTE
PETER WARBURTON

BY Cushman, Darby & Cushman
ATTORNEYS

United States Patent Office 3,192,520
Patented June 29, 1965

3,192,520

BINARY-TO-DIGITAL TRANSLATION APPARATUS

George F. Marette, Minneapolis, Minn., and Peter Warburton, Haddonfield, N.J., assignors to Sperry Rand Corporation, New York, N.Y., a corporation of Delaware Filed Apr. 13, 1960, Ser. No. 22,045
21 Claims. (Cl. 340—347)

This invention relates generally to translating apparatus, and specifically to circuits employing reversibly magnetically biasable elements for translating data from one system of notation into another notation system.

In digital computing machines and in other devices, there is frequent need for apparatus which is capable of decoding or translating signals representing a binary code into corresponding decimal indicating signals. Many different arangements of various circuit components have been used in the past to accomplish this function. A typical example is a device termed a "magnetic-matrix-multi-position switch" which consists of a plurality of saturable core transformers, there being one such transformer for each output of the switch. The primaries of these transformers are connected in series to a common driving source, while the secondary windings individually form the output windings of the device. The control windings which are used to bias the transformer cores are connected in a binary scheme to double throw mechanical switches in such a way that, for each combination of switch positions, one and only one of the cores is not in a saturated condition. When a drive signal is applied, an output will be observed only in the secondary winding associated with the unsaturated core.

As used herein, "digital word" which is employed interchangeably with "digital number," means information represented in a sequence of individual data bits.

As an example of the present invention, a plurality of reversibly biasable magnetic elements, i.e., elements having a magnetization axis from which the element magnetization is reversibly rotatable, are arranged in two sets. All the elements of one set are biased so that the magnetization thereof exists in a different condition than the magnetization of the elements in the other set. Input signals representative of a digital word are coupled to different elements from both sets, thereby causing certain of these elements to become unbiased while causing others to become biased. A plurality of output lines are coupled to the plurality of magnetic devices such that each output line couples devices which due to their biased condition, as a whole are representative of different binary words. Interrogate means are coupled to all the elements in the two sets whereby the activation thereof second in time to the input signals causes a signal to appear on all of the output lines not coupled to the elements which, as a whole correspond in bias conditions to the digital word represented by the input signals. The output line which is coupled to the group of elements representative of the input digital word, will have substantially no signal impressed thereon.

The preferred embodiments of the present invention utilize bistable magnetic films of the 81:19 nickel iron evaporated type which have single domain thickness and uniaxial anisotropy, as the abovementioned reversibly biasable magnetic elements. However, limitation thereto is not intended.

It is, therefore, an object of the present invention to provide improved apparatus capable of translating data from one system of notation into another.

It is a further object of this invention to utilize magnetic elements which are capable of being reversibly biased to perform such translation.

Another object of this invention is to provide apparatus which utilizes the reversible rotation properties of thin magnetic film elements to perform translation of data from one system of notation into another notation system.

Other objects and advantages of this invention will become obvious to those having ordinary skill in the art by reference to the following detailed description of exemplary embodiments of the apparatus and the appended claims. The various features of the exemplary embodiments may best be understood with reference to the following drawings, wherein:

Figures 1A, 1D:
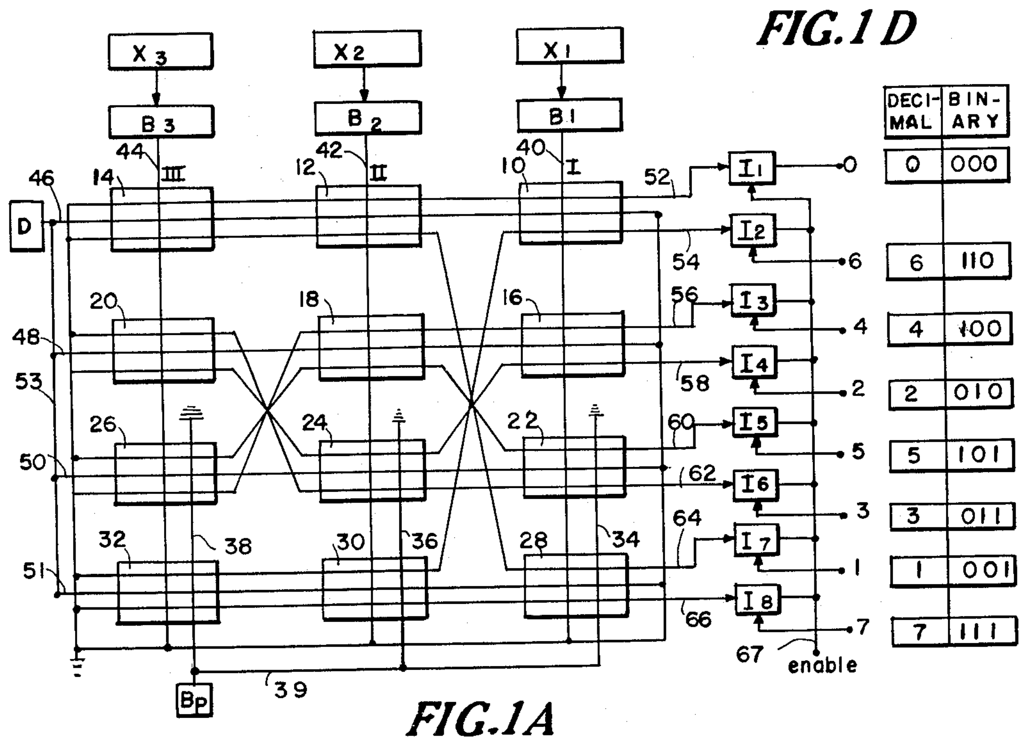
FIGURE 1A illustrates a preferred embodiment of the translator.
FIGURE 1D is a chart for comparing decimal and binary notation systems.

Referring to FIGURE 1A there is shown apparatus for translating binary information of three digits into the decimal equivalent thereof. Although three digits are shown, it is understood that limitation thereto is not intended, the scope of this invention being broad enough to include any desired number of digital inputs as will become clear. A plurality of magnetic elements 10–32 (even numbers only) are aranged in an array composed of groups or columns I, II and III, there being one group for each digit. In general there are as many groups of elements as there are digits to be translated.

Each of the magnetic elements is characterized by being magnetically biasable, preferably reversibly magnetically biasable. Preferably also, though not necessarily so, each element is of the bistable variety such that it has two senses in one of which its remanent magnetization is stable in one direction and in the other of which its remanent magnetization is stable in another direction generally diametrically opposed. Such two opposite directions are generally said to lie along an "easy" magnetization axis which is usually the "preferred," if not the only, "easy" axis of the magnetic element. When a field transverse to its remanent magnetization is applied to an element so as to bias it, the magnetization may rotate in an effort to align itself with that field. However, rotation of the magnetization will proceed only so far as the strength of the transverse field dictates, and if the bias field is not too strong the rotation process will automatically reverse itself upon release of the bias field. Too strong a transverse biasing field will, when applied alone and upon its release, leave the element demagnetized as respects the remanent magnetization along its easy axis. Further, too strong a transverse field when employed in conjunction with a sufficient longitudinal field (one along the easy axis) antiparallel to the instant remanent magnetization will cause the element magnetization to be switched to its opposite direction or stable state. In either of the last two cases, the element magnetization has been biased or rotated beyond a point which may be termed the "irreversible threshold," since the element magnetization will not automatically return to its initial state upon release of the applied field or fields.

Preferably, each of the magnetic elements 10–32 has uniaxial anistropy, i.e., a single easy axis. Even more preferably, each element is what is known in the art as a "thin film" with a thickness in the range of from a few Angstrom units to 10,000 A. so as to provide single domain thickness for the specific material employed. In particular, the material may be an 81:19 nickel iron alloy resulting in film form in accordance with the evaporation teachings of Rubens Patent No. 2,900,282, or any other ferromagnetic material, including those sometimes referred to as "ferrimagnetic," as long as the material is reversibly magnetically biasable as above indicated. The reversible rotation (biasable) properties of thin ferromagnetic films are treated in detail in the copending application of Rubens et al., Serial No. 626,945, filed December 7, 1956, now Patent No. 3,030,612.

In FIGURE 1A, the magnetic elements are shown rectangular, but they may take any other desired shape, for example circular, and the preferred magnetization axis of each is oriented vertically in the illustration with the remanent magnetization of each being preferably pointed in an upward direction.

To initially bias or reversibly rotate the magnetization of half of the elements in the array, a plurality of drive lines 34, 36 and 38 are respectively coupled to the lower set of two elements in the groups thereof. These drive lines are connected in common to line 39 which in turn is connected to a constant current generator $B_P$. The respective drive lines are oriented to lie substantially physically parallel to the preferred axes of each of the elements coupled thereto so that a current flowing from the $B_P$ generator will cause a biasing field to be applied to each element transversely of its preferred axis. It may be noted that the upper set of two elements in each group is not biased, as are the lower sets. Therefore, initially the remanent magnetization of each element in the upper sets is initially differently biased than that in the lower sets and in particular, the remanent magnetization in the upper sets initially lies along its easy axis preferably upward as above indicated.

Input lines 40, 42 and 44 are coupled to all elements in groups I, II, III, respectively. These input lines are physically oriented so as to be substantially parallel, at least in the area of coupling, to the easy axis of magnetization of the elements coupled thereto for applying a transverse field, representing digital data as later explained, to both the upper and lower sets of elements, in a direction opposing but substantially equal to the bias effected by generator $B_P$.

Another plurality of drive lines 46, 48, 50 and 51, hereinafter called "interrogate" lines, are inductively coupled to the element rows respectively in the array. Generator D which is used to activate the interrogate lines is connected in parallel thereto via line 53. The interrogate lines are oriented so as to be substantially perpendicular to the easy magnetization axis of each element coupled thereto so as to apply an interrogation field along the easy axes, preferably antiparallel to the unbiased remanent magnetization of each element.

Output lines 52–66 are each uniquely coupled to the magnetic elements in the array, i.e., each output line is coupled to one magnetic element in each group of elements to effect thereby a different total element coupling therefor than for any other output line. In particular, the output line coupling follows a binary code as will be explained hereinafter in greater detail. Output lines 52–66 are respectively connected to inverters or "not" circuits $I_1$–$I_8$, each of which produces an output signal in the absence of an input signal at its input terminal while producing no output signal in response to an input signal thereat. To eliminate any undesirable noise output signals therefrom which might occur prior in time to activation of the interrogate lines, the operating threshold of the inverters could be set so as to ignore any small signals. Alternatively, the inverter output signals may be gated in time coincidence with the activation of the interrogate lines. An exemplary gating arrangement is shown in FIGURE 1A. Enable line 67 is connected to inverters $I_1$–$I_8$ such that a pulse thereon in time coincidence with a pulse from the D generator will enable the inverters to be responsive to signals on output lines 52–66.

The binary number or word to be translated is normally stored in input registers $X_1$, $X_2$, $X_3$, assuming a three digit word. These registers may, for example, be comprised of a plurality of conventional flip-flop stages having the "1's" output of each connected respectively to input lines 40, 42 and 44 via bias generators $B_1$, $B_2$, $B_3$, if desired.

Figure 1B:
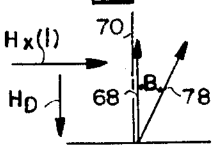
FIGURE 1B illustrates vectorially the magnetic conditions of one set of elements of FIGURE 1A and the fields applied thereto.
Figure 1C:
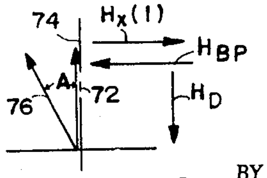
FIGURE 1C illustrates vectorially the magnetic conditions of another set of elements of FIGURE 1A and the magnetic fields applied thereto.

FIGURE 1B shows the magnetic conditions of the elements 10–20 and the fields applied thereto. Each of these elements is preferably initially in its arbitrarily defined "0" condition represented by vector 68. This vector is parallel to the easy axis 70 which may be the preferred axis of any of these elements. In FIGURE 1C the magnetic condition of the remaining elements, i.e., elements 22–32, in the absence of any external fields applied thereto, is as indicated by vector 72. Constant current from the $B_P$ generator flowing in lines 34, 36 and 38 causes a field to be applied to elements 22–32 in a direction transverse to the preferred axes thereof as indicated by vector $H_{BP}$ which causes the magnetization of cores 22–32 to be rotated to some angle A, which, for example, may be in the range of 10° to 15° from the preferred axis 74, as represented by vector 76. When the remanent magnetization of any element lies at an angle with its preferred axis of magnetization, such as that indicated by angle A, for example, the magnetic bias condition of the core is arbitrarily said to be representative of a "1." It can be seen, therefore, that in the absence of any binary input signals, the upper sets of elements in the array, namely elements 10–20, are initially in the "0" bias condition, while the remaining sets of elements are in the "1" bias condition.

As before mentioned, the output lines are arranged throughout the array according to a binary sequence. Considering line 52 as an example, it is seen that elements 10, 12 and 14 are coupled in common thereby. Each of these elements is in a "0" bias condition or state so that output line 52 couples elements representative as a whole of the binary word 000 or the decimal equivalent 0. As a second example, consider output line 60. It couples elements 22, 18 and 26 which respectively are in the "1," "0" and "1" bias state. As a whole, they represent the binary word 101 or the decimal equivalent 5. The remaining output lines all are similarly coupled to elements throughout the array such that in the embodiment shown in FIGURE 1A the binary numbers 000 through 111 and their decimal equivalents 0–7 are represented as indicated by the table in FIGURE 1D, it being understood that the binary values therein result from a left to right reading in the array for the associated output line. It is to be understood, however, that limitation to the stated range of translation is not intended. In general there may be as many digits and different binary words as desired. This is accomplished by adding or subtracting one group of elements for each digit added or subtracted, and coupling the output lines thereto according to the scheme above outlined.

In operation, the word to be translated is entered into the input register stages $X_1$, $X_2$ and $X_3$ by conventional means not shown. The input lines 40, 42 and 44 are respectively connected to the 1's output of each register stage. This output signal produces a transverse field as represented in FIGURES 1B and 1C as vector $H_X(1)$. The effect of this field is to cause the element magnetizations which exist parallel to the preferred axis 70, as represented by vector 68 in FIGURE 1B, to be rotated through an angle B to a position as represented by vector 78, angle B being substantially equal in magnitude to angle A in FIGURE 1C, while at the same time causing the element magnetizations which exist at an angle A with respect to axis 74 to be rotated to a position represented by vector 72 which is substantially parallel to axis 74. A longitudinal $H_D$ field, i.e., a field having a direction parallel to the preferred axes of the elements, applied after but during the existence of the $H_X(1)$ field, and preferably applied antiparallel to the "0" bias condition as represented by vector 68, causes further rotation of the element magnetizations which then exist at an angle to the preferred axes thereof as represented by vectors 76 and 78. This rotation will cause a signal to be induced in the output lines coupled thereto. The arrangement of the array and associated output lines is such that a signal will be induced on all the output lines except the one coupling elements which as a combination, in consideration of their respective initial "1" and "0" bias conditions, correspond with the respective input signals. A current pulse is applied to enable line 67 coincident in time to the application of the $H_D$ field. This pulse enables inverters $I_1$–$I_8$, allowing the output line signals to be inverted thereby, further causing an output signal to appear only on the output terminal wherein correspondence has been achieved.

The operation of the translator may be better understood by considering a specific example. Assume it is desired to translate the binary word or number 110 into its decimal equivalent. As before mentioned, elements 10–20 are initially in a "0" biased condition while elements 22–32 are initially in a "1" biased condition represented respectively by vectors 68 and 76. The above exemplary binary word to be translated appears in the input register such that a "0" digit is in register stage $X_1$, a "1" in register stage $X_2$, and a "1" in register stage $X_3$. An output signal therefore results from stages $X_2$ and $X_3$ activating generators $B_2$ and $B_3$, while no pulse results from generator $B_1$. The current pulse in line 44 due to the activation of generator $B_3$ produces a transverse field as indicated by vector $H_X(1)$ in FIGURES 1B and 1C which is applied to elements 14, 20, 26, 32. This field causes the magnetization of elements 14 and 20 to be rotated to a position as represented by vector 78 in FIGURE 1B, and causes the magnetization of elements 26 and 32 to be rotated from the position as represented by vector 76 back to that of vector 72. Activation of generator $B_2$ causes a current pulse to flow in line 42 which in turn applies transverse field $H_X(1)$ to elements 12, 18, 24 and 30. The magnetization of elements 12 and 18 is rotated to a position as represented by vector 78, while the magnetization of elements 24 and 30 is rotated to a position represented by vector 72. Since there is no external field applied to elements 10, 16, 22 and 28 as a result of the "0" digit in stage $X_1$, the magnetization of each of those elements remains in its initial condition, i.e., the magnetization of elements 10 and 16 stays as represented by vector 68, while the magnetization of elements 22 and 28 stays as represented by vector 76.

A longitudinal interrogate field, as represented by vector $H_D$ in FIGURES 1B and 1C, is then applied during the existence of the $H_X(1)$ field, along the easy axis of all the elements in the array of FIGURE 1A. As before mentioned, this field causes a further rotation of the element magnetizations which are lying at an angle to their respective easy axis. Thus the magnetization of all elements in the array, except elements 10, 16, 24, 26, 30 and 32, will be further rotated, inducing a voltage in the output lines coupled to those elements whose magnetization is so rotated. It will be noted that output line 54 is the only line which is coupled to elements none of whose magnetization has been rotated by the interrogating field $H_D$. Thus, a signal appears on output lines 52, 56, 58, 60, 62, 64 and 66, while no such signal appears on output line 54. When a signal is applied to line 67 coincident in time to the application of the $H_D$ field, inverters $I_1$–$I_8$ are enabled allowing the output signals to be inverted thereby, and causing a further output signal to be produced only from inverter $I_2$ to decimal output terminal 6.

As seen from the FIGURE 1D chart, an output signal from inverter $I_2$ corresponds to the representation of a decimal 6 which is the correct translation of the binary input word 110.

An inspection of FIGURE 1A will reveal that when the total number of output lines employed equals S, the maximum number of binary words which can then be translated is equal to S, because each output line is uniquely coupled to the magnetic elements in a given binary arrangement as respects the "0" and "1" bias conditions thereof above described. S need not be the maximum number of output lines usable (eight as in FIGURE 1A) since any less number can be employed, for example five if it is known ahead of time the largest decimal number to be translated is 4. In any case, the total number S of output lines may be divided equally amongst the magnetic elements per column so that there is then $s$ output lines (two in FIGURE 1A) coupled to each element in the array. These generalizations apply to any embodiment of the invention as will be later apparent.

If it were physically possible to place an unlimited number of output lines in inductive relation with any magnetizable element, the number of elements required to translate or decode an $n$ bit word would be equal to $2n$, and the number of output lines linking each element would be equal to $2^{n-1}$. Since the physical dimensions of ferromagnetic films and lines will not permit an unlimited number of lines per film, additional films are required for large decoders when the limit of output lines per film is exceeded.

In order to determine the number of films required and the number of output lines per film elements, the following equations may be employed:

$$f=2^m n \quad (1)$$

$$s=2^{n-m} \quad (2)$$

where $f$=the number of film elements required
$s$=the number of output lines/film element
$n$=the number of bits to be decoded
$m$=an integer in the range $1 \leqslant m \leqslant n$.

Equations 1 and 2 show that for each $n$, there is not just one arrangement, but a set of $n$ arrangements each characterized by the limitations:

$$fs=2^n n \quad (3)$$

and $$\frac{f}{n}=\text{an integer} \quad (4)$$

Thus, a translator may be designed in accordance with this invention with a variable number of films and output lines per film for a given $n$ bit input word by varying the value of $m$. In practice, the particular value of $m$ that gives the best economical compromise between a low $f$ and a low $s$ is preferred.

Figure 2:
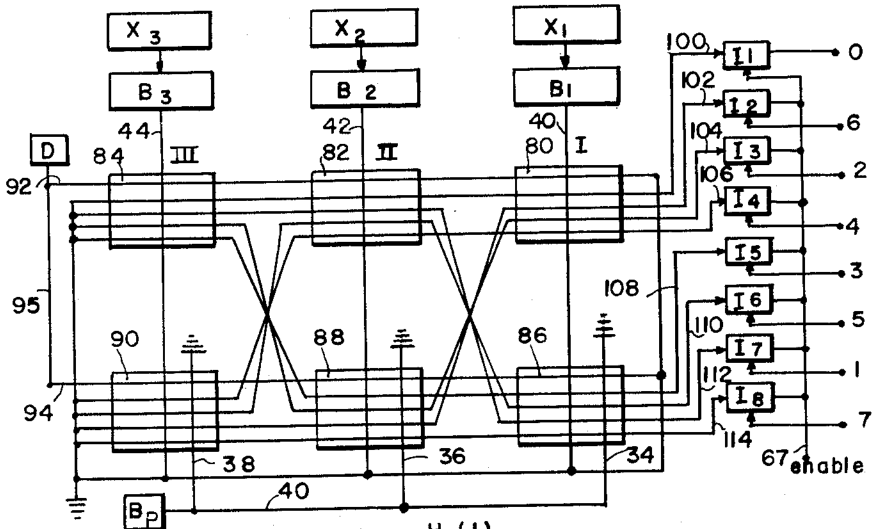
FIGURE 2 illustrates another embodiment of the translator.
Figure 3:
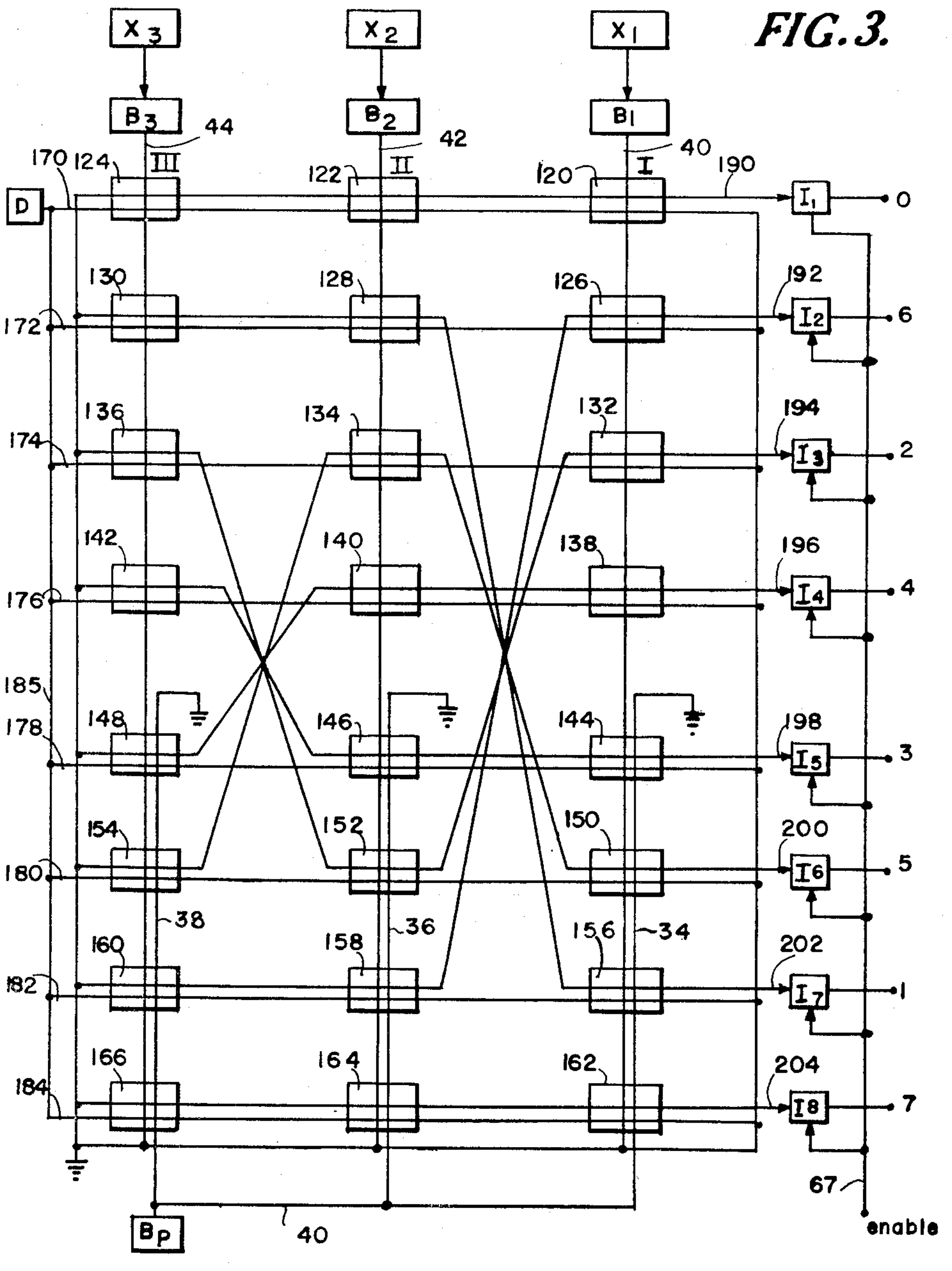
FIGURE 3 illustrates still another embodiment of the translator.

FIGURES 2 and 3 have been included to illustrate in conjunction with FIGURE 1A, the maximum number of translator arrangements for a three bit word, by showing the variable number of films and output lines per film that can be had therefor. FIGURE 2 is obtained by letting $m=1$, and finding by the above equations that $f=6$ and $s=4$ while $n=3$. Consequently, in this translator there is an array of the minimum films necessary for a three bit word, i.e., six films 80–90 which correspond to the films 10–32 in FIGURE 1A. Interrogate lines 92 and 94 couple all the elements in the array to generator D through line 95 and correspond to interrogate lines 46, 48, 50 and 51 in FIGURE 1A. Output lines 100–114, couple the films in the array according to a binary arrangement similar to that above described and correspond to output lines 52–66. The remaining parts of this translator are the same as that of the FIGURE 1A embodiment and have been so designated, and the operation of the six film translator is the same as that of the twelve film translator.

In FIGURE 3, $m=3$, $f=24$ and $s=1$ while $n=3$. This embodiment illustrates the maximum number of films employable for a given number of digits (three) and the least number of output lines per film. The array formed by film elements 120–166 corresponds to the array of film elements 10–32 in FIGURE 1A. Interrogate lines 170–184 couple all the elements in the array to pulse generator D through line 185 and correspond to interrogate lines 46, 48, 50 and 51 of FIGURE 1A. Output lines 190–204 couple films in the array according to a binary arrangement like that previously mentioned and correspond to output lines 52–66. The other parts of this translator and its operation are the same as for the FIGURE 1A embodiment.

Considering FIGURES 1A, 2 and 3, it will be noted there are in each column either 2, 4 or 8 magnetic elements, respectively, according to the value of $m$ for the particular arrangement. Therefore, it may be said that the number of magnetic elements in each group (column) is $2^m$ where $m$ is an integer variable from 1 to $n$. Likewise, it is apparent that the number of initially biased or initially unbiased elements per group is $2^{m-1}$.

In the preferred embodiments, in the absence of any external fields, the remanent magnetization of the film elements lies parallel to the preferred axes thereof in a direction as indicated by vectors 68 and 72 as previously indicated. However, the magnetization of any element may be initially oriented 180° from the direction of vectors 68 and 72 without deleterious effect, and therefore the translator will still function even if an element switches in response to an $H_D$ pulse. However, since the component of the change in magnetization due to the $H_D$ field is larger when the remanent magnetization of an element is initially oriented as indicated by vector 68, that orientation both initially and during use of the translator is preferred for all elements in the array because a larger output signal is produced from each such element when the magnetic axis of the output line coupled thereto is parallel to the $H_D$ field. That field should therefore be of insufficient strength to switch any element or even rotate its magnetization to the irreversible threshold thereof which is generally in the range of from 30° to 45° according to the element material amongst other things.

Further, while in the preferred embodiments the orientation of the physical or longitudinal axis of each output line is perpendicular to the preferred axis of each element coupled thereto, limitation to this orientation is not intended, since the output lines can be oriented at any angle especially if the output signals are gated out through the inverters in time coincidence with the $H_D$ pulses as shown in the preferred embodiments. The angle of 90° therebetween is preferred because there is then no cancelling of oppositely directed magnetic change components coupled by any output line and due to rotation clockwise or counterclockwise by the $H_D$ field, and also to insure minimum coupling between any output line and the fields produced by the binary input signals or their rotational effects.

Thus it is apparent that there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and accompanying drawings be interpreted as illustrative and not limitative, the scope of the invention being defined in the appended claims.

What is claimed is:

1. Translating apparatus comprising a plurality of magnetic elements capable of being biased, means for biasing a part of said elements differently than the remainder thereof, input means coupled to each element for selectively altering the bias of all said elements in accordance with a word to be translated, means for applying a magnetic field to each element to determine the net bias thereof, and a plurality of output means uniquely coupled to said plurality of elements such that each output means couples in common a different predetermined combination of said elements any of which combinations represents a different predetermined word than any other such combination in accordance with any biasing of the elements in that combination as effected if at all by the first mentioned means, for providing output signals upon application of said magnetic field.

2. Apparatus as in claim 1 wherein the word to be translated is represented by binary input signals in said input means, wherein the means for biasing part of said elements magnetically biases each of those elements a predetermined amount for representing a first binary value of bias, the amount of bias on the remainder of elements being substantially zero and representing a second binary value of bias, whereby the said different combinations of elements respectively coupled by said output means respectively represent different binary words, said input signals when in one binary sense being effective on elements coupled thereto to substantially cancel the said first binary bias in such elements having same and to bias any so coupled elements having said second binary bias substantially the said predetermined amount in a direction opposite to said first binary bias, while the input signals when in another binary sense are substantially ineffective on elements coupled thereto in changing their respective biases, whereby some elements after the application of the input signals are in an unbiased state and others are in a biased state, the magnetic field upon subsequent application being such as to further alter the bias on only the elements then in a biased state to cause due to such further altering a given output signal from all but one of said output means which is the one that is coupled to elements none of which have their bias changed by the said magnetic field and which by their bias due to the first mentioned biasing means represent the same word as the one translated.

3. Translating apparatus comprising a plurality of magnetic elements each capable of being magnetically biased, said elements being arranged in $n$ groups each of which is divided into two parts, means for biasing the element magnetization of each element in one of said parts of each group, $n$ input lines respectively coupled to the $n$ element groups for respectively carrying input signals, each input signal having two senses and when in one sense being effective to bias the element magnetization of each element in the respective group to which that signal is coupled in a direction opposite to that effected by the said biasing means, and when in a second sense being substantially ineffective to bias the magnetization of any element, means for applying an interrogation field to each element, and a plurality of output lines each uniquely coupled to $n$ elements respectively from said $n$ groups for carrying output signals upon application of said interrogation fields.

4. Apparatus as in claim 3 wherein the number of magnetic elements in each group is $2^m$ where $m$ is an integer in the range of from 1 to $n$ inclusive.

5. Apparatus as in claim 3 wherein the number of magnetic elements in each of said parts of each group is $2^{m-1}$ where $m$ is an integer in the range of from 1 to $n$ inclusive.

6. Apparatus as in claim 3 wherein the total number of magnetic elements is $f$, the number of output lines coupled to any given magnetic element is $s$, and wherein $$f=2^m n$$

$$s=2^{n-m}$$

$$fs=2^n n$$

and $$\frac{f}{n}=\text{an integer}$$

with $m$ being an integer selected from the range 1 to $n$ inclusive.

7. Apparatus for translating $n$ binary digits comprising a plurality of magnetic elements having reversibly rotatable magnetization properties, said elements being arranged in $n$ groups each of which is divided into halves, biasing means for rotating the element magnetization of each element in one of said halves of each group, $n$ input lines respectively coupled to the $n$ element groups for respectively carrying binary signals representing said binary signals representing said binary digits, each binary signal when in one sense being effective to rotate the element magnetization of each element in the respective group to which that signal is coupled in a direction opposite to, and substantially the same amount as, that effected by the said biasing means, and when in an opposite sense being substantially ineffective to rotate the magnetization of any element, means for simultaneously applying an interrogation field to each element, and a plurality of output lines each uniquely coupled to $n$ elements respectively from said $n$ groups for carrying decimal output signals upon application of said interrogation fields.

8. Apparatus as in claim 7 wherein the elements coupled in common by any output line represent an $n$ digit binary number in accordance with the amount of magnetization rotation effected by the said biasing means in all the elements coupled to that output line, which number is different than that represented by the elements coupled by any other output line.

9. Apparatus for translating any of S binary words each of which have $n$ binary digits comprising a plurality of magnetic elements each of which have an easy axis of magnetization along which the remanent magnetization may lie in either of two different senses with the remanent magnetization being reversibly rotatable away from its easy axis to at least an irreversible rotational threshold, said elements being arranged in $n$ equal groups each of which is divided in half, means for initially rotating the remanent magnetization of each element in only one of the halves of each group a predetermined amount away from its easy axis but less than to said threshold, the remanent magnetization being initially non-rotated and in one of said senses in the elements of the other half of each of said groups, $n$ input lines respectively coupled to the said $n$ groups for respectively carrying binary signals representing any one of said binary words, the said easy axis of each element being parallel with the associated input line at least in the area of coupling, each binary signal when in one sense being effective to rotate the previously rotated magnetization of any element coupled thereto back into substantial alignment with its easy axis and when in an opposite sense being substantially ineffective to rotate the magnetization of any element, means for applying an interrogation field along the easy axis of each element to cause rotation of the magnetization of each element whose magnetization is then not in substantial alignment with its easy axis, and S output lines each coupled to a different $n$ elements than another with those elements being respectively from said $n$ groups of elements, the output line coupling being such that with the convention of the said initial rotation and lack of such rotation of the remanent magnetization of elements representing binary states each output line couples elements initially representing a different one of the S binary words which may be applied by said input lines, whereby upon application of said interrogation field to each element at the same time only one of the S output lines carries a signal representing in decimal form the translation of the binary word coupled to the elements.

10. Apparatus as in claim 9 wherein the said magnetic field applying means applies said field in a direction substantially antiparallel to the remanent magnetization of each element in an amount insufficient to rotate the instant magnetization of any element to said irreversible rotational threshold, whereby upon release of said field the thereby rotated magnetization of any element rotates in a reverse direction.

11. Apparatus as in claim 10 wherein the remanent magnetization of all said elements are oriented in the same direction before any rotation of any element remanent magnetization.

12. Apparatus for translating $n$ digits comprising a plurality of magnetic elements possessing reversible magnetic rotation properties and an easy magnetization axis, said elements being arranged in $n$ groups each of which is divided into halves, means for biasing the magnetization of each element in one of said halves of each group to cause rotation of said magnetization away from its easy axis, the magnetization of the elements in the other half of each group lying substantially parallel to the easy axis thereof, $n$ input lines respectively coupled to the $n$ element groups for respectively carrying binary signals representing said binary digits, each binary signal when in one sense being effective to rotate the magnetization of each element coupled thereto in a direction opposite to and substantially the same amount as that effected by said biasing means, and when in an opposite sense being substantially ineffective to rotate the magnetization of any element, means for applying an interrogate field to each element, and a plurality of output lines coupled to said elements for carrying decimal output signals, each output line being coupled in common to one element from each group such that the elements coupled in common by any one output line as a whole represent an $n$ digit binary number different than that for any other output line coupled elements.

13. Apparatus as in claim 12 wherein each of said magnetic elements is of the ferromagnetic film type.

14. Apparatus as in claim 13 wherein each magnetic element has a single domain thickness.

15. Translating apparatus comprising an input register of $n$ bistable stages, each stage thereof being representative of a binary digit so that the register as a whole is representative of an $n$ digit binary number, a plurality of ferromagnetic film elements each having reversibly rotatable magnetization properties and an irreversible rotational threshold, a portion of said elements being initially unbiased so that the magnetization thereof lies parallel to the preferred axes of the elements, means for initially biasing the remaining elements so that the magnetization of each relative to its easy axis lies at an angle which is less than the irreversible rotational threshold thereof, means coupling said plurality of elements to said input register for rotating the magnetization of a selected one or ones of said magnetic elements in accordance with the binary number representation of said input register to an angle less than said irreversible rotational threshold, a plurality of output means coupled uniquely to said magnetic elements such that each output means couples elements which as a whole are initially biased to represent one of a plurality of different binary numbers of $n$ digits each, and means coupled to said plurality of elements for further rotating the magnetization of each element whose magnetization then exists at an angle to its said easy axis thereby inducing a signal on the output means coupled thereto, the arrangement being such that the magnetization of the elements coupled in common to an output means which elements are initially biased so as to represent the same binary number as is represented by said input register will lie parallel to the said easy axis of those elements and no signal will be induced on the said output means coupling same, while the remaining output means will have a signal induced thereon.

16. Apparatus as in claim 15 wherein the said further magnetization rotation means causes rotation, of any element magnetization which it rotates, to a degree less than the irreversible rotational threshold of the element.

17. Translating apparatus comprising an input register of $n$ bistable stages, each stage thereof being representative of a binary digit so that the register as a whole is representative of an $n$ digit binary number, $f$ magnetic elements each having reversibly rotatable magnetization properties and an irreversible rotational threshold, said element being arranged in $n$ groups, a plurality of bias lines coupled respectively to each element of one half of each group for rotating the magnetization thereof to a degree less than said threshold, $n$ input lines respectively coupling the elements of each group to each register stage so that the input lines as a whole carry binary signals representative of the $n$ digit binary number, said binary signals when of one sense being effective to rotate the magnetization of each element in the group coupled thereto in a direction opposite to and substantially the same amount as that effected by activation of said bias lines, and when in an opposite sense being substantially ineffective to rotate the magnetization of any element, a plurality of drive lines coupled to all the elements for applying an interrogate field thereto, and $s$ output lines for carrying decimal output signals upon application of said interrogation field, each output line being coupled in common to one magnetic element in each group of elements to effect thereby a different common element coupling therefor than for any other output line, each output line thereby coupling $n$ elements which as a whole represent an $n$ digit binary number, wherein:

$$f=2^{m}n$$

and $$s=2^{n-m}$$

with $m$ being an integer selected from the range 1 to $n$ inclusive.

18. Apparatus as in claim 17 wherein each of the magnetic elements has a preferred magnetization axis, the input and bias lines are oriented substantially parallel to said axes, and the drive lines are oriented substantially perpendicular to said axes.

19. Apparatus as in claim 18 wherein the said output lines are oriented substantially parallel to the drive lines in the element areas.

20. Apparatus as in claim 17 wherein said magnetic elements are of the ferromagnetic film type.

21. Apparatus as in claim 20 wherein each of said magnetic elements is of single domain thickness.

References Cited by the Examiner

UNITED STATES PATENTS

| | | | |
|---|---|---|---|
| 2,843,838 | 7/58 | Abbott | 340—166 |
| 2,920,317 | 1/60 | Mallery | 340—347 |
| 3,023,402 | 2/62 | Bittmann | 340—174 |

OTHER REFERENCES

Oakland, Lewis J., "Coincident-Current Nondestructive Readout From Thin Magnetic Films," Journal of Applied Physics, supplement to vol. 30, Nov. 4.

MALCOLM A. MORRISON, *Primary Examiner.*

EVERETT R. REYNOLDS, *Examiner.*

UNITED STATES PATENT OFFICE
CERTIFICATE OF CORRECTION

Patent No. 3,192,520 June 29, 1965

George F. Marette et al.

It is hereby certified that error appears in the above numbered patent requiring correction and that the said Letters Patent should read as corrected below.

Column 2, line 35, for "aranged" read -- arranged --; column 3, line 33, strike out "initially" and insert the same after "not", same line 33; line 70, strike out "in-"; column 9, lines 7 and 8, strike out "representing said binary signals".

Signed and sealed this 9th day of August 1966.

(SEAL)
Attest:

ERNEST W. SWIDER
Attesting Officer

EDWARD J. BRENNER
Commissioner of Patents